United States Patent
Johansson et al.

(10) Patent No.: US 8,861,388 B2
(45) Date of Patent: Oct. 14, 2014

(54) SELECTION OF TRANSMISSION MODE

(75) Inventors: Magnus Johansson, Göteborg (SE); Jonas Karlsson, Sollentuna (SE); Magnus Gannholm, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 887 days.

(21) Appl. No.: 13/062,825

(22) PCT Filed: Sep. 11, 2008

(86) PCT No.: PCT/EP2008/062078
§ 371 (c)(1),
(2), (4) Date: Mar. 8, 2011

(87) PCT Pub. No.: WO2010/028688
PCT Pub. Date: Mar. 18, 2010

(65) Prior Publication Data
US 2011/0164528 A1    Jul. 7, 2011

(51) Int. Cl.
*H04W 72/00* (2009.01)
*H04L 1/00* (2006.01)

(52) U.S. Cl.
CPC ............. *H04L 1/0033* (2013.01); *H04L 1/0026* (2013.01); *H04L 1/0019* (2013.01)
USPC ......................................................... 370/252

(58) Field of Classification Search
USPC ........... 375/267, 141; 455/101, 522; 370/460, 370/335, 252
See application file for complete search history.

(56) References Cited

U.S. PATENT DOCUMENTS

| | | | |
|---|---|---|---|
| 2003/0035490 A1* | 2/2003 | Gollamudi | 375/267 |
| 2004/0067738 A1* | 4/2004 | Raghothaman | 455/101 |
| 2007/0160162 A1* | 7/2007 | Kim et al. | 375/267 |
| 2007/0211786 A1* | 9/2007 | Shattil | 375/141 |
| 2007/0263655 A1* | 11/2007 | Esteves et al. | 370/460 |
| 2008/0080634 A1* | 4/2008 | Kotecha et al. | 375/267 |
| 2008/0081655 A1* | 4/2008 | Shin et al. | 455/522 |
| 2008/0285522 A1* | 11/2008 | Ma et al. | 370/335 |
| 2008/0285675 A1* | 11/2008 | Roberts | 375/267 |
| 2009/0086648 A1* | 4/2009 | Xu et al. | 370/252 |

OTHER PUBLICATIONS

"Overcoming interference in spatial multiplexing MIMO cellular networks" IEEE Wireless Communications, IEEE Service Center, Piscataway, NJ, US, vol. 14, No. 6, Dec. 1, 2007 XP011199025 ISSN: 1536-1284.

* cited by examiner

*Primary Examiner* — Asad Nawaz
*Assistant Examiner* — Parth Patel

(57) ABSTRACT

A method and apparatus for a cellular system is provided. Communication is carried out between a controlling station of a cell and a number of users in said cell, and the controlling station is equipped with a plurality of antennas. The communication can alter between a first and a second mode, and the users in the cell provide the controlling station with feedback information regarding their reception quality. The controlling station alters between said first and second modes of communication as a result of the reliability of the feedback information from the users in the cell, so that if the reliability is above a first threshold, the first mode is used, and if the reliability is equal to or below said first threshold, the second mode is used.

11 Claims, 6 Drawing Sheets

SELECTION OF TRANSMISSION MODE

TECHNICAL FIELD

The present invention discloses a method for selection between different transmission modes in a cellular telecommunications system.

BACKGROUND

In cellular telecommunications systems such as, for example, systems of the LTE (Long Term Evolution) system, it is expected that many of the controlling stations ("Base stations") of the cells in the systems will be equipped with a plurality of antennas for communication with the users of their cells, and that the users equipments, in many cases, will also be equipped with a plurality of antennas.

The availability of a plurality of antennas in a controlling station and in the user's equipment will enable a more frequent use of such transmission modes as, for example, transmit diversity, spatial multiplexing and beam forming. However, different multi-antenna transmission modes are optimal for use under different circumstances, both in the controlling stations and in the user's equipment.

SUMMARY

Since, as explained above, different multi-antenna transmission modes are optimal for use under different circumstances, a purpose of the present invention is to offer a method for choosing between different such modes in an optimal manner, particularly in the controlling stations.

This purpose is addressed by the present invention in that it discloses a method for use in a cellular telecommunications system, according to which method communication is carried out between a controlling station of a cell and a number of users in the cell, and the controlling station is equipped with a plurality of antennas.

According to the method of the invention, the communication can alter between a first and a second mode, and the users in the cell provide the controlling station with feedback information regarding their reception quality of transmissions from the controlling station.

The controlling station alters between the first and second modes of communication as a result of the reliability of the feedback information from the users in the cell, so that if the reliability is above a first threshold, the first mode is used, and if the reliability is equal to or below said first threshold, the second mode is used, In one embodiment of the invention, the Signal to Noise and Interference Ratio, the SINR, for one or more of the users is used by the controlling station as an additional criterion for deciding which mode to use, so that if the SINR is above a second threshold and the reliability criteria for the first mode is fulfilled, the first mode is used; otherwise the second mode is used.

In a situation where multiple antennas are available for the controlling station, the antennas can still be used in two fundamentally different manners, i.e. as correlated antennas or as uncorrelated antennas. If the antennas are correlated, this means that they are deployed and used in such a manner that the users in the cell perceive them as one single antenna. On the other hand, if the antennas are used in an uncorrelated manner, this means that they are deployed and used in such a manner that the users in the cell perceive them as separate antennas. Both of these manners of usage of multiple antennas are covered by the present invention, In one embodiment of the invention, in which the antennas of the controlling station are correlated, the antennas can also be used for so called beam forming, with the beam forming being used as a third mode of communication, in addition to the first and second modes.

In one version of the beam forming embodiment, the beam forming is used if the feedback reliability is above the first threshold and the controlling station has information regarding the angular position of one or more user in the cell which is above a third threshold, the third threshold being related to the accuracy of the angular position.

These and other embodiments of the invention will be described in more detail in the text below.

The invention also discloses a controlling station for use according to the inventive method.

BRIEF DESCRIPTION OF THE DRAWINGS

The invention will be described in more detail in the following, with reference to the appended drawings, in which.

DETAILED DESCRIPTION

Figure 1:
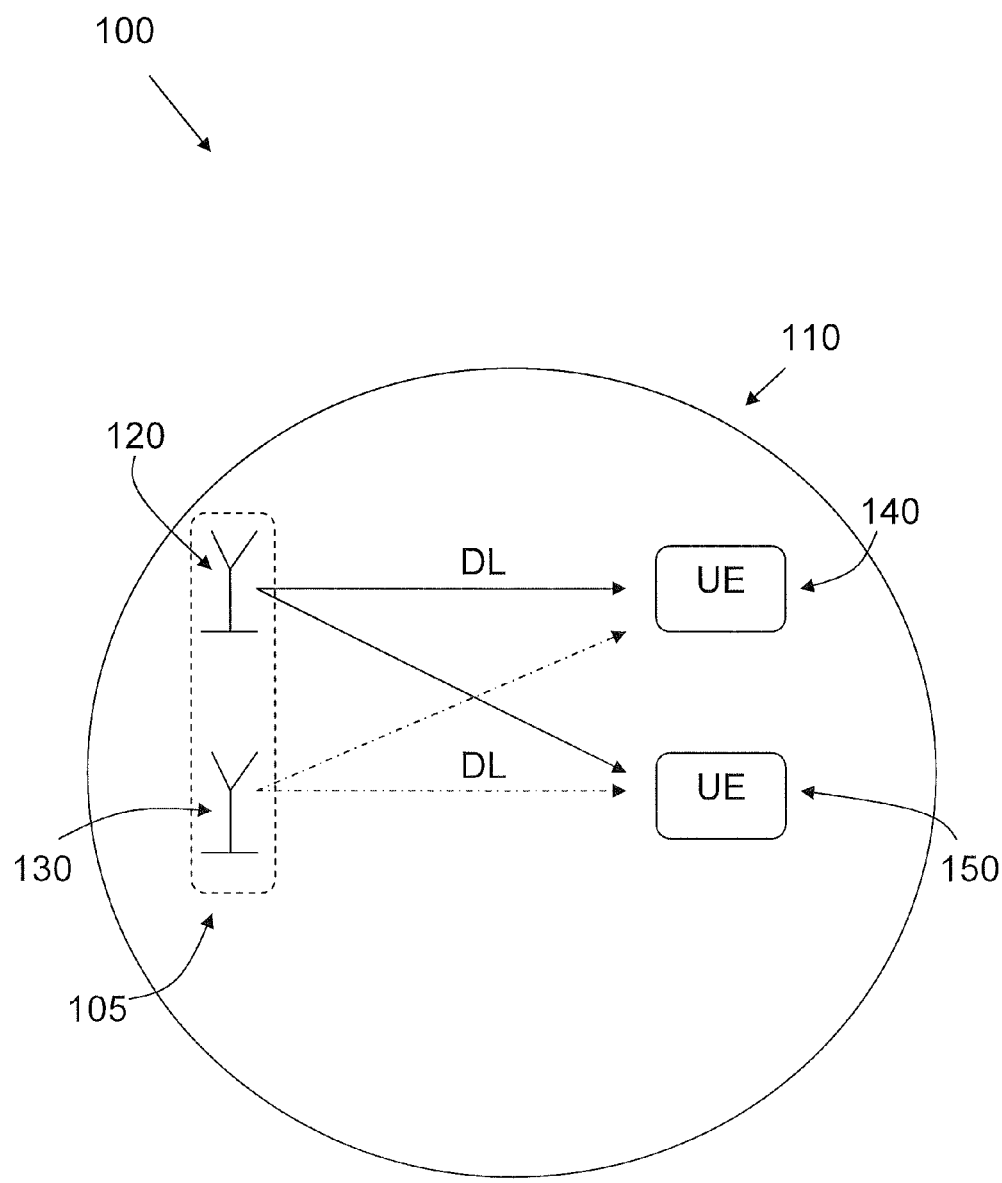
FIG. 1 shows a schematic overview of a system in which the invention is applied.

FIG. 1 shows a schematic view of a cellular telecommunications system 100 in which the invention can be applied. FIG. 1 only shows one cell, 110, but it will be understood that this is only to facilitate the description and the understanding of the invention, the system 100 can comprise a more or less arbitrary number of cells with the same basic features as the cell 110.

The cell 110 comprises a controlling station 105 which serves, inter alia, to control the traffic to and from users. Two users are shown in FIG. 1 as 140 and 150, and are also indicated as UE, User Equipment. The number of users is also an example; a cell can comprise a more or less arbitrary number of UEs.

As shown in FIG. 1, the controlling station 105 is equipped with a plurality of antennas 120, 130, for the communication with the UEs in the cell. As indicated by means of arrows, at least two of the antennas in the controlling station may be used for communication with all of the UEs in the cell. The communication is indicated as DL, downlink, i.e. from the controlling station to the users.

Figure 2:
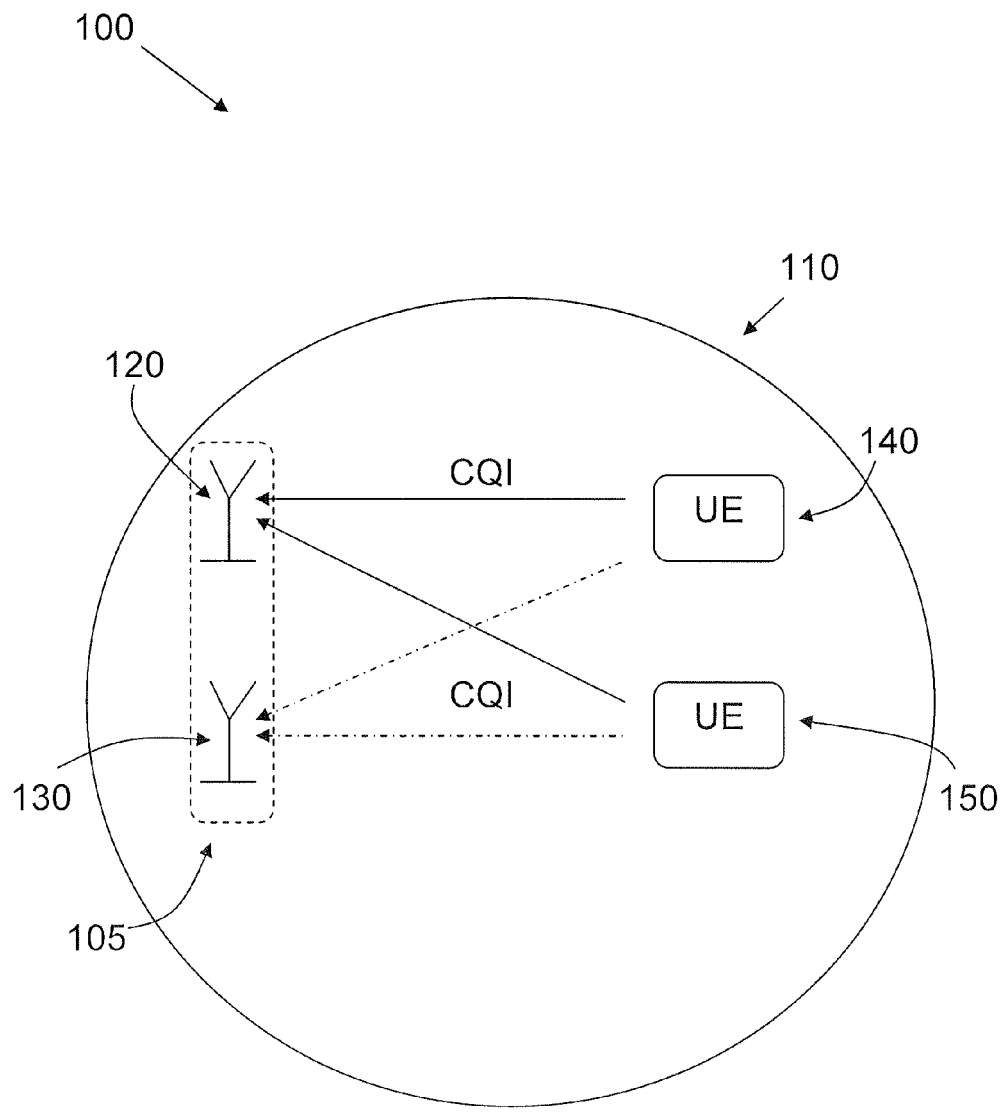
FIG. 2 shows a further detail of the system of FIG. 1.

In a system in which the invention is applied, the users 140,150 will supply the controlling station with information regarding their reception quality of transmissions from the different antennas of the controlling station, which is indicated in FIG. 2 by means of arrows in the uplink direction. The quality information is indicated in FIG. 2 as CQI, Channel Quality Information, which is an LTE term. However, for the purposes of the invention, the quality information returned by the UEs may be of many different kinds apart from the LTE CQI format.

The availability of more than one antenna enables the controlling station 105 to use a number of different so called multi antenna transmission techniques and modes, and a purpose of the present invention is to enable the controlling station, in LTE terminology the eNodeB, to choose technique or mode in an optimal manner.

Before the mechanism of the invention is explained in detail, a brief background will be given to familiarize the reader with the terminology used in this text and with multi antenna technologies in general, as well as in the LTE standard.

Thus, some of the multi antenna techniques are general, while some are LTE specific and are used in LTE in various so called multi antenna transmission modes. Examples of both the general techniques, their LTE application and of the LTE multi antenna transmission modes will be given below; it should be understood that the present invention may be applied both to systems with the more general kind of multi antenna transmission techniques and the LTE specific multi antenna transmission modes.

General Multi-Antenna Techniques

1. Spatial diversity: Channel variations in the spatial domain can be reduced by transmitting the same information over multiple paths of the channel, i.e. from multiple antennas. Spatial diversity exploits the multiple transmit antennas in order to reduce the variations in a fading radio channel, and is a multi-antenna transmission technique which does not require detailed knowledge about the radio channel between the transmitter and receiver, and is therefore beneficial to use when the controlling station doesn't have detailed channel knowledge about a certain UE. This could for instance be due to the fact that the UE is moving fast, which causes its radio channel to exhibit rapid fading. Another alternative is if the controlling station only receives infrequent feedback about the radio channel quality from the UE. Transmit diversity may also be desirable to use for UEs with poor channel quality (this can typically be measured as a low SINR), as well as for users with low data rate transmissions.

2. Spatial multiplexing: By transmitting different information over different paths of the channel, i.e. via different antennas, the cell throughput is increased. When using spatially multiplexed transmissions, independent streams of data are transmitted from the transmitter (i.e. the controlling station), and relies on multi-antenna receiver algorithms in the receiver (i.e. UE) to separate the data streams that have been mixed during the transmission. Depending on the radio channel, varying numbers of data streams can be "resolved" by the receiver, i.e. the UE. The number of streams that can be supported varies with the radio channel, and is suitably fed back from the UE to the controlling station. This adaptation of the number of streams is suitably done on a short time scale, i.e. in the order of a few milliseconds.

Techniques Used in LTE Specific Multi-Antenna Modes

The LTE standard supports multi-antenna transmission in both downlink and uplink, although the present invention focuses on the downlink application. It should however be pointed out that the principles of the present invention may also be applied in uplink applications.

In LTE, the multi-antenna techniques mentioned previously, i.e. spatial diversity and spatial multiplexing, are performed in the following manner:

Spatial Diversity

Spatial diversity can in the LTE downlink be realized by so called TX diversity, in which each antenna transmits the same information but with different coding. TX diversity is especially useful when the eNodeB (controlling station) antennas are uncorrelated, since diversity gain is achieved then. If the antennas are correlated, TX diversity is especially useful for common channels which need to cover essentially the entire cell.

Spatial Multiplexing

In the LTE downlink, spatial multiplexing, in LTE sometimes also referred to as multi-stream single-user MIMO, can be realized by letting the eNodeB, when the channel allows it, transmit two code words (coded transport blocks) to one and the same UE. This requires uncorrelated antennas both in the eNodeB and in the UE. The eNodeB "maps" each of the code words to antenna ports in such a way that SINR per codeword is maximized in the receiver, i.e. the UE. Feedback from the UE is needed in order to decide if the channel allows two code words, and how to perform the antenna mapping. The phrase "if the channel allows it" should here be taken to mean criteria in the uplink such as, for example, SINR above a certain threshold and/or a coherency time which is above than a certain minimum value.

Multi-stream single-user MIMO not only increases the cell throughput, but also increases the maximum UE throughput. In this mode, feedback-based antenna mapping is used.

Another spatial multiplexing technique in LTE is so called "multi-user MIMO": When the channels allow it, the eNodeB transmits two code words to two different UEs, with the same two code words being transmitted to both UEs. This can be regarded as beam formed single-user MIMO per UE, with the addition that the inter-layer or "inter-stream" interference needs to be minimized, i.e. the interference between different data streams to one and the same user. The multi-user MIMO mode works for correlated as well as for uncorrelated antennas at the eNodeB side.

Beam Forming

General Case

A third form of multi antenna transmission technique, which is also encompassed by the present invention, is so called beam forming. In the general case, beam forming is obtained by transmitting the same signal on more than one antenna, with different phase on those antennas, in order to create a directed beam. By focusing the transmitted signal towards the receiver, the interference is reduced and the link budget is improved, which can suitably be used for improved coverage or for increased throughput. A pre-requisite is that the antennas used for beam forming are correlated and that the eNodeB is able to track the position of the UE regarding angle and, if possible, distance to the eNodeB. The eNodeB may use dedicated reference signals in order to help the UE to perform channel estimation, or it may rely on common reference signals in which case the phase of the beam formed signal needs to be adapted to the phase of the common reference signals.

LTE Beam Forming

In the LTE downlink, beam forming can be realized either in the "traditional" way described above, or in the following manner, known as Spatial multiplexing or beam formed single-user MIMO: In this case, the eNodeB transmits a number of code words to the UE, said number being smaller than the number of transmit antennas in the eNodeB. The eNodeB maps the code words to the antennas in such a way that the SINR in the UE is optimized. The mechanism with feedback-based antenna mapping is the same as for multi-steam single-user MIMO. Beam formed single-user MIMO works both for correlated and for uncorrelated antennas, although correlated antennas are preferred.

It can be mentioned that LTE at present supports a maximum of 4 eNodeB transmit antennas for transmit diversity and spatial multiplexing. For beam forming, there is no upper limit on the number of antennas.

Multi-Antenna Transmission Modes in LTE

In LTE, the multi-antenna transmission modes do not exactly follow the multi-antenna transmission techniques as described above. The multi antenna transmission modes in LTE are instead referred to as "closed loop" and "open loop", and a third mode, Dedicated Reference Signals, RS. In order to explain these modes, the notion of "rank" in LTE first needs to be explained briefly, and can be said to correspond to the number of data streams which is transmitted simultaneously by the eNodeB.

Thus, for example, when the rank is equal to 1, only one data stream is transmitted. This corresponds either to transmission from a single antenna or more traditional beam forming from multiple antennas. The number of data streams that can be supported varies with the radio channel, and is suitably based on feedback from the receiver to the transmitter. The adaptation of the number of streams in LTE is also known as rank adaptation, and needs to be done on a short time scale, i.e. in the order of a few milliseconds.

Returning now to the multi antenna transmission modes in LTE, open loop and closed loop, they are as follows:
Open loop:
If the rank=1: Use transmit diversity
If the rank>1: Use spatial multiplexing with large-delay CDD, cyclic delay diversity.
Closed loop:
Spatial multiplexing with zero or small-delay CDD
If the rank=1: Use beam formed MIMO.
If the rank>1: Use multi-stream MIMO.

As a third multi antenna transmission mode in LTE, there is the so called dedicated RS mode, which essentially corresponds to beam forming with dedicated RS, reference signals, as described above.

Turning now to the mechanism disclosed by the present invention for choosing between various modes of communication between the controlling station (eNodeB) and the UEs in the cell, it should be pointed out that the basic mechanism of the invention may be used in systems other than LTE, although the invention will be exemplified below with an LTE system. Thus, the communication modes chosen between may be other modes than the LTE open/closed loop or LTE beam forming, and the reliability criteria used may be other than those described below.

As mentioned previously, according to the invention, a factor which is used for choosing between the various modes is the reliability of feedback information from the UEs to the eNodeB, so that a reliability value for the feedback information is determined and compared to a "reliability threshold".

One way of measuring the reliability is by means of the coherence time of the channel used for the feedback information, as measured against the time between the CQI reports and the scheduling allocations. In other words, if a CQI is received from UE1 at $t_1$, and the scheduling allocation is done at $t_2$, then the difference $t_r-t_2$ needs to be smaller than the coherence time by a certain predefined amount.

Another factor which may be used in conjunction with the reliability of feedback information is the coherence bandwidth of the channel in question. Preferably, the coherence bandwidth should exceed the frequency granularity in the so called Precoding matrix indicator, the PMI, in the CQI. The PMI can be described in the following manner: one dimension of the matrix is the data streams, also referred to as layers. The other dimension is the antennas, so that in the general case each data stream is distributed over all antennas, and all antennas transmit all streams. It should be noted that the matrix elements have both phase and amplitude, and that the amplitude could be zero. If a matrix element is zero, the corresponding layer will not be transmitted on the corresponding antenna. For beam formed MIMO, the matrix elements are zero for all layers except one.

The notions of coherence bandwidth and coherence time may be explained as follows: the coherence bandwidth is the bandwidth over which the CQIs including PMIs are of a certain quality, and the coherence time is the period of time during which the CQIs are of that quality.

The reason that make the two criteria described above suitable for use when estimating the reliability of the feedback information, in LTE the CQI, is that if these two criteria enable a prediction of optimal rank and precoding matrix from the CQI. The precoding matrix comprises information on the amplitude and phase to be used in the antennas used.

There are two main alternatives for measuring channel coherence time: either (preferably) by means of downlink channel coherence time estimation based on the CQIs from one or more UE, or by means of uplink channel coherence time estimation based on measurements in the eNodeB.

Figure 3:
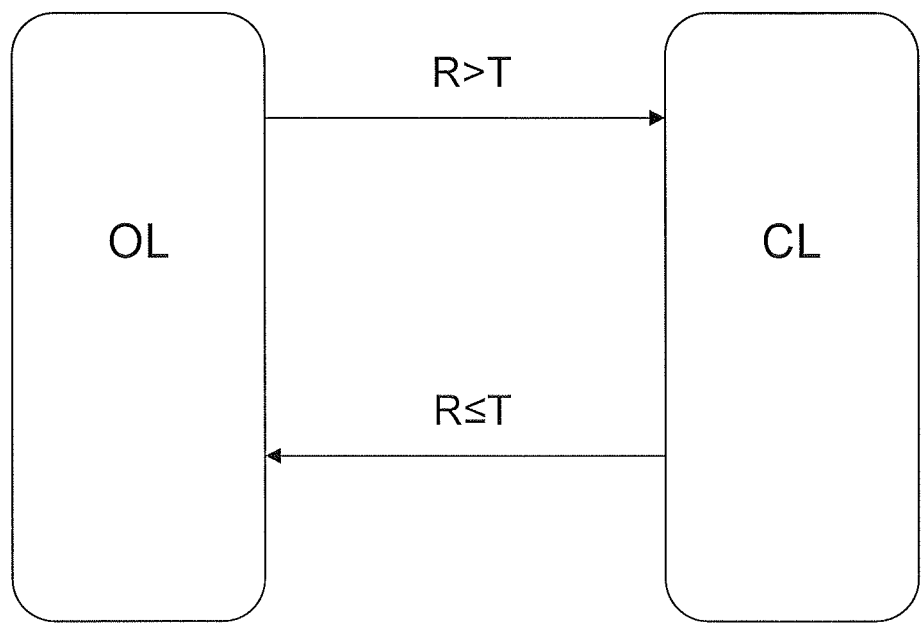
FIG. 3 shows a flowchart of a first embodiment of the invention.

FIG. 3 schematically shows the altering between the two multi antenna transmission modes, i.e. closed loop CL, and open loop, OL, as a function of the reliability R versus a threshold T. Another factor which may also be taken into account when calculating the reliability R is the SINR, the Signal to Noise and Interference Ratio, in the UEs, which is reported back to the UEs with the CQI.

As has been described above, when using multiple antennas the antennas in question can be used either uncorrelated or correlated. When using the antennas in an uncorrelated manner, only the modes shown in FIG. 3, open and closed loop, are altered between, and the "switching criterion" is the feedback reliability.

When using correlated antennas, the mode switching described above and shown in FIG. 3 is perfectly feasible, but in one version of the invention a third mode, LTE beam forming, may also be an alternative. This is illustrated schematically in FIG. 3, which shows three modes, the two modes (OL/CL, i.e. Open Loop/Closed Loop) from FIG. 3, as well as a third mode, BF, beam forming. One criterion for using the beam forming mode is that the eNodeB can estimate the angle to the UE, sometimes also referred to as the Direction of Arrival DoA, with a sufficient degree of accuracy, i.e. if the accuracy is above a predefined threshold, $T_{DoA}$.

One way of checking if the DoA is sufficiently accurate is to attempt beam forming in different directions, and to see if the SINR in the uplink improves or deteriorates in the different angles. If there is no improvement or deterioration between a first estimated angle and a second angle, then the accuracy of the first angle cannot be assumed to be sufficient.

Another criterion for using beam forming is that the interference caused in adjacent cells is below a certain level, here referred to as $T_{INT}$, since beam forming as such involves concentration of the radiation, which might cause interference in adjacent cells, the so called "flashlight effect". The eNodeB is suitably informed of the interference level in the adjacent cells by higher nodes in the system, such as for example, the controlling node of the cell.

Figure 4:
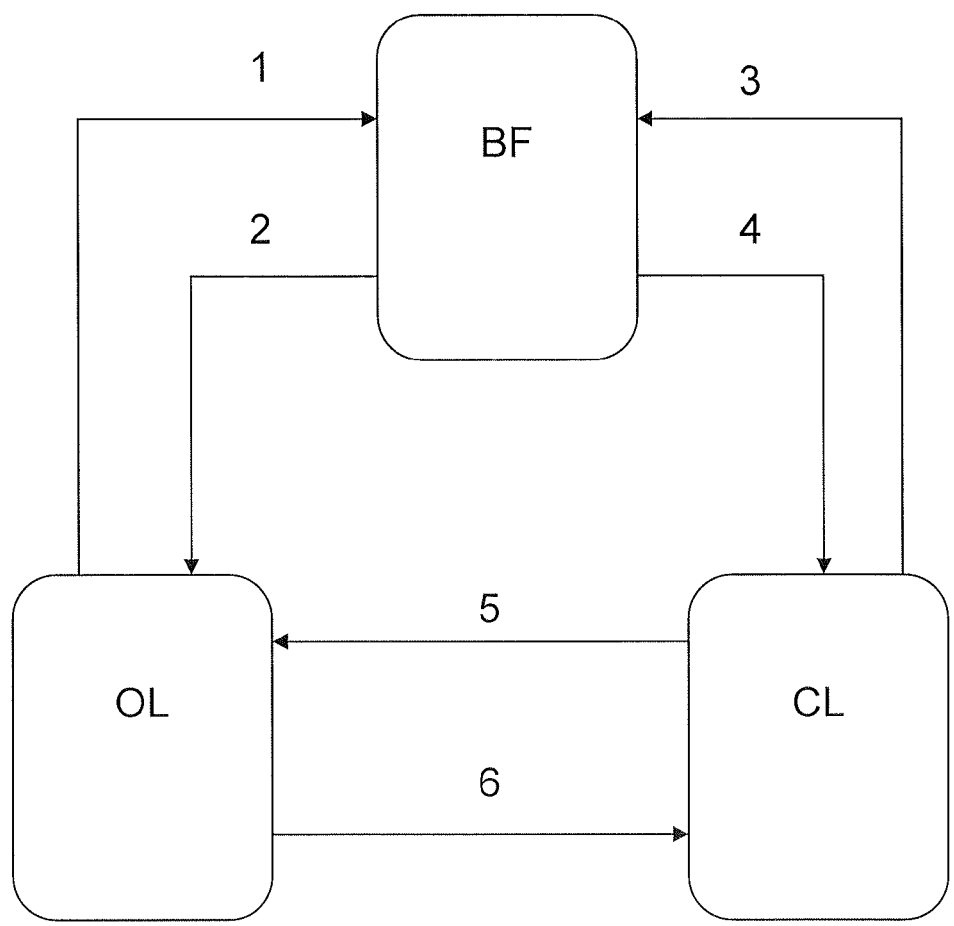
FIG. 4 shows a flowchart of a second embodiment of the invention.

The criteria used by the present invention for switching between the three modes (OL/CL/BF) have been numbered 1-6 in FIG. 4 and will be described below.

| Criterion no | From mode | To mode |
|---|---|---|
| 1 | OL | BF |
| 2 | BF | OL |
| 3 | CL | BF |

| Criterion no | From mode | To mode |
| --- | --- | --- |
| 4 | BF | CL |
| 5 | CL | OL |
| 6 | OL | CL |

Criterion 1: If (the DoA estimate is above its threshold $T_{DOA}$ AND the interference caused in adjacent cells is below a certain interference threshold, $T_{INT}$).

Criterion 2: If (the DoA estimate is below or equal to the threshold $T_{DOA}$ OR the interference caused in adjacent cells is above a certain interference threshold, $T_{INT}$) AND (the CQI is unreliable OR the SINR at the UE is insufficient).

Criterion 3: If (the DoA estimate is above its threshold $T_{DOA}$ AND the interference caused in adjacent cells is below a certain interference threshold, $T_{INT}$).

Criterion 4: If (the DoA estimate is below or equal to the threshold $T_{DOA}$ OR the interference caused in adjacent cells is above a certain interference threshold, $T_{INT}$) AND (the CQI is reliable AND the SINR at the UE is sufficient).

Criterion 5: If (the CQI is unreliable OR the SINR at the UE is insufficient) AND (the DoA estimate is below or equal to the threshold $T_{DOA}$ OR the interference caused in adjacent cells is above a certain interference threshold, $T_{INT}$).

Criterion 6: If (the CQI is reliable AND the SINR at the UE is sufficient) AND (the DoA estimate is below or equal to the threshold $T_{DOA}$ OR the interference caused in adjacent cells is above a certain interference threshold, $T_{INT}$).

The basic selection of multi-antenna transmission mode, closed loop or open loop, can further be tuned by taking into account several other parameters.

Cell load: The cell load will affect the amount of flashlight effect seen in other the cells. Since different multi-antenna transmission modes will cause different amount of flashlight effect, the cell load will affect the switch-over-point between different multi-antenna transmission modes.

User throughput: The past user throughput (or more accurately, the future throughput) will partly affect the amount of flashlight effect, and partly the needed processing power in the UE (the battery life can be optimized by the selection of multi-antenna transmission mode).

Figure 5:
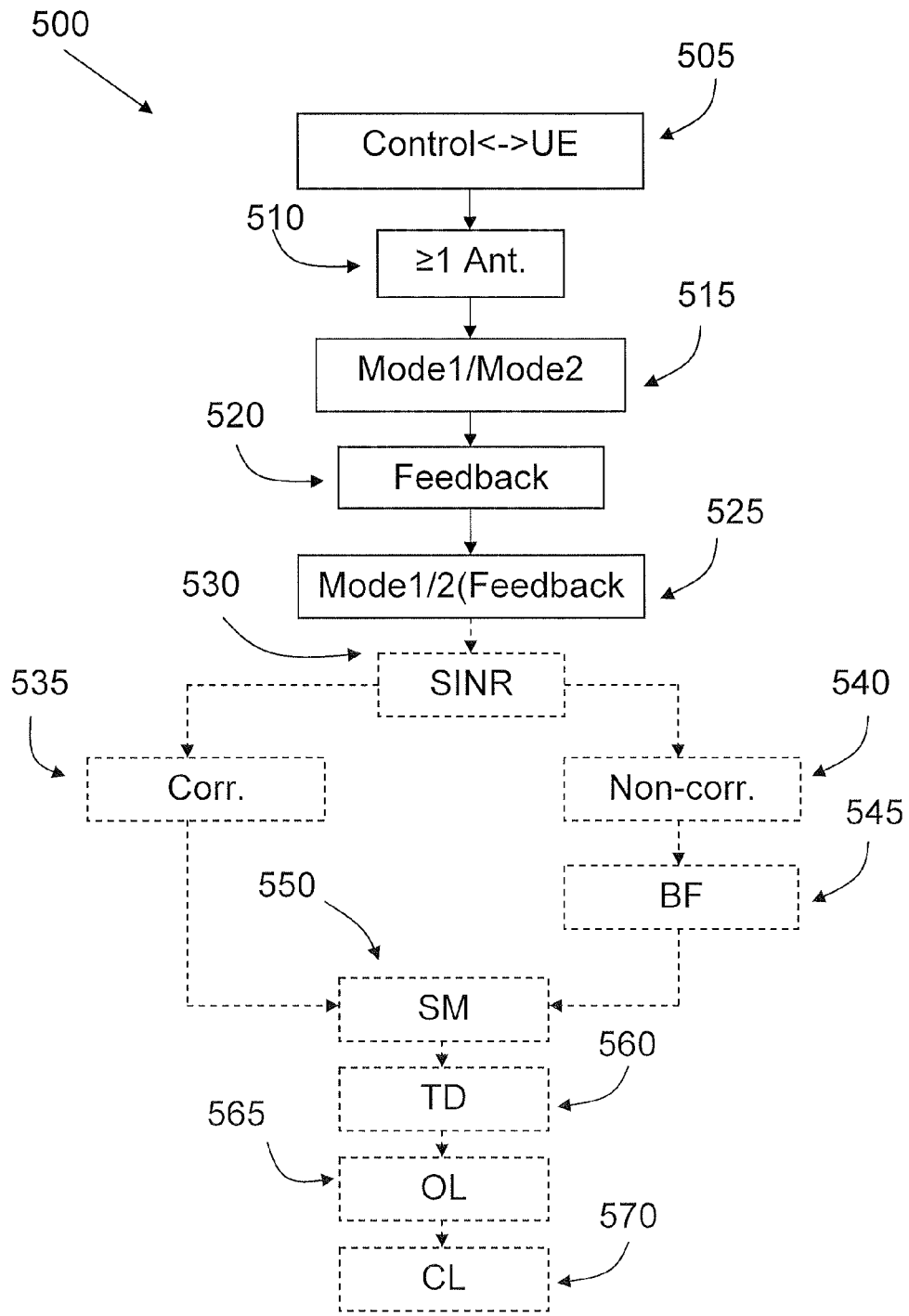
FIG. 5 shows a flowchart of a method of the invention.

FIG. 5 shows a schematic flow chart of a method 500 of the invention. Steps which are options or alternatives are shown with dashed lines in FIG. 5.

As explained previously, the method 500 is intended for use in a cellular telecommunications system, and according to the method, as shown in step 505, communication is carried out between a controlling station such as an eNodeB of a cell and a number of users in the cell. A shown in step 510, the controlling station is according to the invention equipped with a plurality of antennas, and as indicated in step 515, the communication can alter between a first and a second mode. Step 520 shows that the users in the cell provide the controlling station with feedback information such as CQI regarding their reception quality of transmissions from the controlling station—

According to the method 500, as shown in step 525, the controlling station alters between the first and second modes of communication as a result of the reliability of the feedback information from the users in the cell, so that if the reliability is above a first threshold, the first mode is used, and if the reliability is equal to or below said first threshold, the second mode is used, In one embodiment, as indicated in step 530, the Signal to Noise and Interference Ratio, the SINR, for one or more of the users is also used by the controlling station as a criterion for deciding which mode to use, so that if the SINR is above a second threshold and the reliability criteria for the first mode is fulfilled, the first mode is used, and otherwise the second mode is used.

Step 540 shows that the method can be applied if the antennas of the controlling station are uncorrelated, i.e. deployed and used in such a manner that the users in the cell perceive them as separate antennas, or, alternatively, as shown in step 535, if the antennas of the controlling station are correlated, i.e. deployed and used in such a manner that the users in the cell perceive them as one single antenna.

Step 545 shows that in the case of non-correlated antennas, the antennas can also be used for beam forming, with the beam forming being used as a third mode of communication, in addition to said first and second modes.

In a further embodiment, beam forming is used if the controlling station has information regarding the angular position of one or more user in the cell which is above a third threshold, said third threshold being related to the accuracy of the angular position.

In another embodiment, the traffic load in the cell is also used as input for the decision regarding which of said modes of communication that is used, while another factor for this may also be the user throughput in the cell.

As shown in step 550, in one embodiment the first communication mode is spatial multiplexing, and in one embodiment the second communication mode is transmit diversity, as shown in step 560.

The method 500 is in one embodiment applied to an LTE (Long Term Evolution) system, in which case, as shown in step 570, the first mode of communication is the closed loop communication of LTE, and, step 565, the second mode of communication is the open loop communication of LTE Suitably but not necessarily, the feedback information from the users is the CQI (Channel Quality Information) of LTE.

Also, in one embodiment, a criterion of the reliability of the feedback information is the coherence time of the channel used for the communication, with a minimum coherence time used in order to establish reliability, and/or the coherence bandwidth of the channel used for the communication, with a minimum coherence bandwidth used in order to establish reliability.

Figure 6:
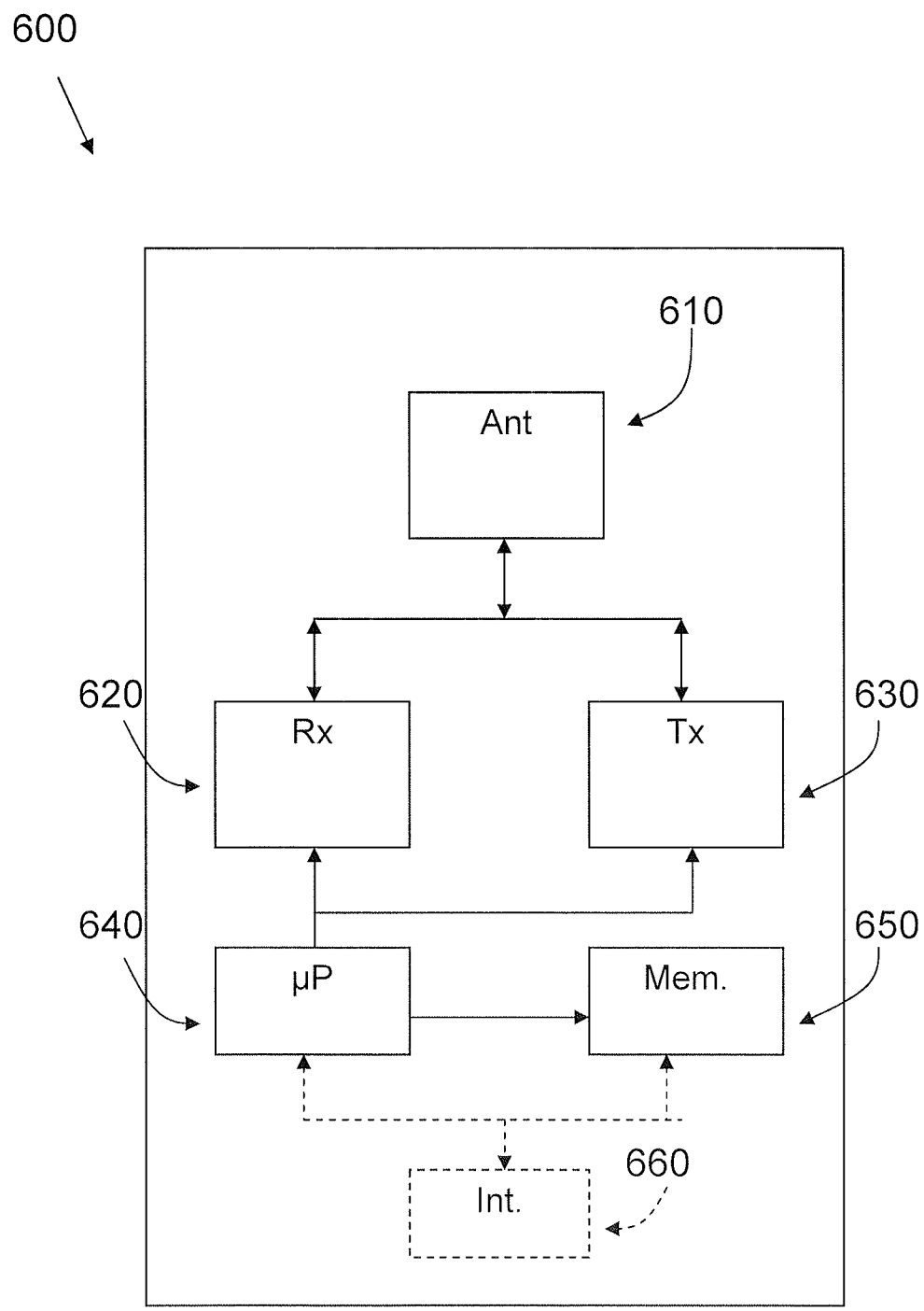
FIG. 6 shows a block diagram of a controlling station of the invention.

FIG. 6 shows a schematic block diagram of a controlling station such as an eNodeB 600 for use in a system in which the invention is applied. As indicated in FIG. 6, the eNodeB 600 comprises a plurality of antennas, shown as block 610 and also comprises a receive part 620 and a transmit part 630. In addition, the eNodeB 600 also comprises a control means 640 such as a micro processor, as well as a memory 650. Furthermore, the eNodeB 600 also comprises an interface 660 towards other components in the system apart from the UEs.

Since the major components of the eNodeB 600 have been identified above both with respect to their function with and their reference numbers, they may in the following be referenced merely by their reference numbers, e.g. "the means 650", instead of "the memory 650".

The eNodeB 600 is thus equipped with a plurality of antennas 610 and uses the means 610, 620, 630, 640, 650 for altering its communication with users in a cell between a first and a second mode and also for receiving from those users feedback information regarding their reception quality of transmissions from the eNodeB.

According to the invention, the eNodeB alters between its first and second modes of communication as a result of the reliability of the feedback information from the users in the cell, so that if the reliability is above a first threshold, the first mode is used, and if the reliability is equal to or below said first threshold, the second mode is used, In one embodiment, the eNodeB 600 also uses the Signal to Noise and Interference Ratio, the SINR, for one or more of the as a criterion for deciding which mode to use, so that if the SINR is above a second threshold and the reliability criteria for the first mode is fulfilled, the first mode is used, and otherwise the second mode is used.

In one embodiment, of the eNodeB 600, the antennas 610 are uncorrelated, i.e. deployed and used in such a manner that the users in the cell perceive them as separate antennas, or they may be correlated, i.e. deployed and used in such a manner that the users in the cell perceive them as one single antenna.

In one embodiment of the eNodeB 600, the first mode of communication is the closed loop communication of LTE, whilst the second mode of communication is the open loop communication of LTE The invention is not limited to the examples of embodiments described above and shown in the drawings, but may be freely varied within the scope of the appended claims.

The invention claimed is:

1. A method for use in a cellular telecommunications system, according to which method:
    communication is carried out between a controlling station of a cell and a number of users in said cell,
    the controlling station is equipped with a plurality of antennas, the communication can alter between an open loop, closed loop and a beamforming mode of communication,
    the users in the cell provide the controlling station with feedback information, denoted channel quality information, regarding their reception quality of transmissions from the controlling station, the altering of the open loop, closed loop and a beamforming mode of communication moreover being dependent on, a signal to noise and interference ratio caused in adjacent cells and a direction of arrival accuracy to the user, wherein
    if, in open loop,
    the direction of arrival accuracy estimate is above-a direction of arrival threshold
    and
    the interference caused in adjacent cells is below a certain interference threshold,
        switching to beam forming;
    if, in beam forming,
    the direction of arrival accuracy estimate is below or equal to the direction of arrival threshold the or the interference caused in adjacent cells is above the interference threshold
    and
    the channel quality information is unreliable or the interference in adjacent cells at the user is insufficient
        switching to open loop;
    if, in closed loop,
    the channel quality information is unreliable or the interference in adjacent cells at the user is insufficient
    and
    the direction of arrival accuracy estimate is below or equal to the direction of arrival threshold or the interference caused in adjacent cells is above the interference threshold,
        switching to open loop;
    if, in open loop,
    the channel quality information is reliable and the interference in adjacent cells at the user is sufficient
    and
    the direction of arrival accuracy estimate is below or equal to the direction of arrival threshold or the interference caused in adjacent cells is above the interference threshold,
        switching to closed loop.

2. Method according to claim 1, moreover comprising the steps of
    if in closed loop
    the direction of arrival accuracy estimate is above the direction of arrival threshold
    and
    the interference caused in adjacent cells is below interference threshold,
        switching to beam forming,
    if in beam forming
    the direction of arrival accuracy estimate is below or equal to the direction of arrival threshold or the interference caused in adjacent cells is above the interference threshold,
    and
    the channel quality information is reliable and the interference caused in adjacent cells at the user is sufficient
        switching to closed loop.

3. The method of claim 1, according to which the channel quality is the coherence time of the channel used for the communication, with a minimum coherence time used in order to establish reliability.

4. The method of claim 1, according to which the channel quality is the coherence bandwidth of the channel used for the communication, with a minimum coherence bandwidth used in order to establish reliability.

5. The method of claim 1, according to which the traffic load in the cell is also used as input for the decision regarding which of said modes of communication that is used.

6. The method of claim 1, according to which the user throughput in the cell is also used as input for the decision regarding which of said modes of communication that is used.

7. The method of claim 1, according to which the first mode of communication is the closed loop communication of long term evolution.

8. The method of claim 1, according to which the second mode of communication is the open loop communication of long term evolution.

9. The method of claim 1, according to which the feedback information from the users is the CQI of long term evolution.

10. A controlling station such as an eNodeB for use in a cell of a cellular telecommunications system, the eNodeB being equipped with a plurality of antennas and with means for altering its communication with users in said cell between an open loop, closed loop and a beamforming mode of communication and for receiving from said users feedback information denoted channel quality information regarding their reception quality of transmissions from the controlling station,
    the altering of the open loop, closed loop and a beamforming mode of communication moreover being dependent on, a signal to noise and interference ratio caused in adjacent cells and a direction of arrival accuracy to the user, the controlling station moreover being adapted for
    if, in open loop,
    the direction of arrival accuracy estimate is above a direction of arrival threshold
    and the interference caused in adjacent cells is below a certain interference threshold,
> switching to beam forming;

if, in beam forming, the direction of arrival accuracy estimate is below or equal to the direction of arrival threshold th or the interference caused in adjacent cells is above the interference threshold and the channel quality information is unreliable or the interference in adjacent cells at the user is insufficient
> switching to open loop;
> if, in closed loop, the channel quality information is unreliable or the interference in adjacent cells at the user is insufficient and the direction of arrival accuracy estimate is below or equal to the direction of arrival threshold or the interference caused in adjacent cells is above the interference threshold,
> switching to open loop;
> if, in open loop, the channel quality information is reliable and the interference in adjacent cells at the user is sufficient and the direction of arrival accuracy estimate is below or equal to the direction of arrival threshold or the interference caused in adjacent cells is above the interference threshold,
> switching to closed loop.

11. The controlling station according to claim 10, moreover being adapted for if in closed loop the direction of arrival accuracy estimate is above the direction of arrival threshold and the interference caused in adjacent cells is below interference threshold,
> switching to beam forming;

if in beam forming the direction of arrival accuracy estimate is below or equal to the direction of arrival threshold or the interference caused in adjacent cells is above the interference threshold, and the channel quality information is reliable and the interference caused in adjacent cells at the user is sufficient
> switching to closed loop.

* * * * *

UNITED STATES PATENT AND TRADEMARK OFFICE
CERTIFICATE OF CORRECTION

| | | |
|---|---|---|
| PATENT NO. | : 8,861,388 B2 | Page 1 of 1 |
| APPLICATION NO. | : 13/062825 | |
| DATED | : October 14, 2014 | |
| INVENTOR(S) | : Johansson et al. | |

It is certified that error appears in the above-identified patent and that said Letters Patent is hereby corrected as shown below:

In the Claims

In Column 9, Line 52, in Claim 1, delete "threshold the" and insert -- threshold --, therefor.

In Column 10, Line 10, in Claim 2, delete "Method" and insert -- A method --, therefor.

In Column 11, Line 6, in Claim 10, delete "threshold th" and insert -- threshold --, therefor.

Signed and Sealed this
Nineteenth Day of May, 2015

Michelle K. Lee
*Director of the United States Patent and Trademark Office*